May 24, 1932. F. G. THWAITS 1,859,479
SANITARY VENT FOR GRAVITY MILK TANKS
Filed June 24, 1929

INVENTOR.
BY Frederick G. Thwaits
Morsell, Keeney & Morsell
ATTORNEYS.

Patented May 24, 1932

1,859,479

UNITED STATES PATENT OFFICE

FREDERICK G. THWAITS, OF WAUWATOSA, WISCONSIN, ASSIGNOR TO THE HEIL CO., OF MILWAUKEE, WISCONSIN, A CORPORATION OF WISCONSIN

SANITARY VENT FOR GRAVITY MILK-TANKS

Application filed June 24, 1929. Serial No. 373,176.

This invention provides a sanitary vent for gravity milk-tanks, preferably of the portable or truck type, and the main object of the invention is to so construct the vent that it will permit the entrance of air into the tank while the milk is being drawn off from the tank and will permit the discharge of air from the tank while the tank is being filled with milk, as more fully hereinafter set forth.

In the drawings annexed—

Figure 1:
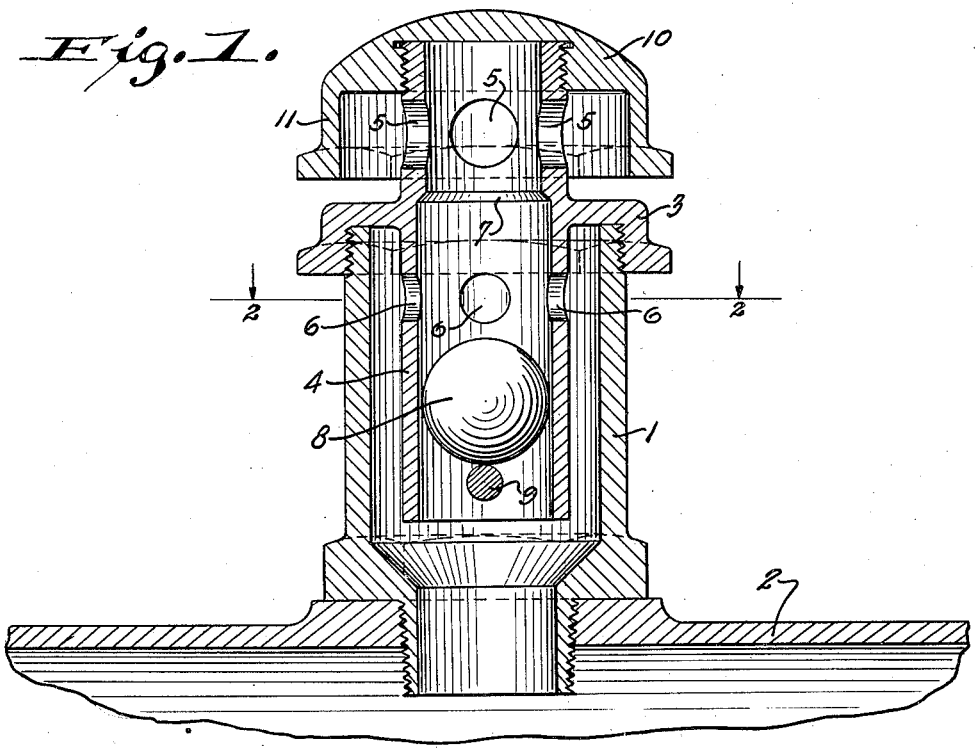
Fig. 1 is a vertical sectional view of my device applied to the top-wall of the tank.
Figure 2:
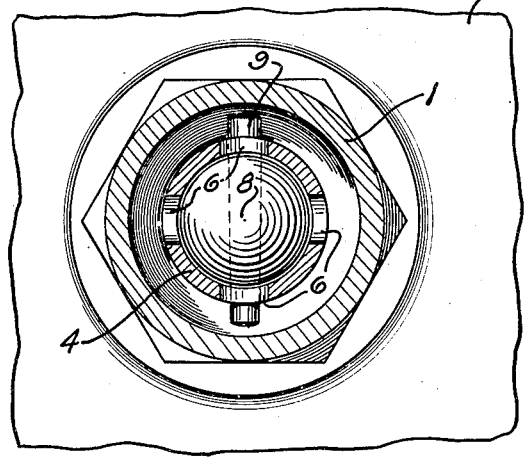
Fig. 2 is a horizontal sectional view on the line 2—2 of Fig. 1.

Referring to the annexed drawings by reference-numerals, 1 designates a cylindrical hollow casing screwed into a hole in the top-wall of the tank 2 and having its outer end closed by a cover 3 screwed down over the end, said cover being integrally provided with a valve-tube 4 which depends into the casing and has its lower end open so as to be in communication with the interior of the tank 2. The upper end of the valve-tube 4 extends above the cover 3 and is provided with a series of lateral openings 5 to keep the interior of the valve-tube always in communication with the atmosphere outside of the milk-tank. At a point below the cover 3, the valve-tube is provided with another series of openings 6 which put this tube in communication with the interior of the casing 1 and thence in communication with the interior of the milk-tank 2. Between the openings 6 and the openings 5 is formed a downwardly-facing valve-seat 7, and adapted to seat on this valve-seat 7 is a ball-valve 8 which is mounted in the valve-tube 4 and normally rests upon a stop 9 carried at the lower end of the valve-tube, the position of the stop being such that the normal position of the ball-valve 8 will be at a point below the air-passages 6. The ball-valve 8 is slightly less in diameter than the interior of the valve-tube, so as to have the capacity of rolling freely from the stop 9 to the seat 7. To keep dust, rain and snow from entering the upper air-passages 5 and the upper end of the valve-tube, I provide the upper end of the valve-tube with a cap 10 which is screwed exteriorly to the upper end of the valve-tube and is provided with a depending apron 11 which depends far enough to shield the air-passages 5.

It will be observed that this venting device permits air to flow freely into the milk-tank 2 while the milk is being discharged therefrom and also permits air to pass freely out of the tank while the tank is being filled with milk. It will be observed that the valve 8 is not actuated during either the filling or the emptying operation. The sole purpose of this valve is to automatically close against the seat 7 should the tank be upset or tilted far enough to spill the milk through this venting device, thus preventing accidental loss of milk through tilting or overturning of the tank. It will be observed also that, by reason of the circuitous air path through the venting device, it will be impossible for the most violent agitation of the milk in the tank to cause the milk to splash out through the venting device. It will be observed also that, should the milk in the tank splash up high enough to be deposited in the air-passages 6 and the weather be cold enough to freeze the milk therein, the jouncing of the truck will in most cases be sufficient to cause the ball-valve to bounce high enough to assist in breaking up the ice formation in the air-passages and thus tend to keep them clear of iced milk.

What is claimed as new is:

1. A vent device for a milk tank, comprising a casing having threaded lower and upper ends, a closure member threaded on the upper end of the casing and having a tubular portion which extends downwardly into the casing and also upwardly above the closure member, both of said tubular portions having lateral air passages, a cap closing the upper end of the tubular portion and extending in spaced relation around the upper air passages, said tubular portion between the upper and lower air passages having a valve seat, and a ball valve supported and closely confined for rolling within the bore of the tubular portion below the lower air passages but movable upwardly to directly engage the valve seat and close the bore between the upper and lower air passages.

2. A vent device for a tank, comprising, inner and outer concentric tubular casings spaced apart to provide an annular space the lower end of which is in open communication with the tank and the upper end of which is sealed, said inner casing having lower ports connecting said space with the interior of said casing and also having upper ports connecting the said interior with the atmosphere, a valve seat formed within said inner casing between said lower and upper ports, and a ball valve closely confined for rolling within said inner casing and directly engageable with said seat to interrupt communication between said lower and upper ports.

In testimony whereof, I affix my signature.

FREDERICK G. THWAITS.